(12) United States Patent
Smith et al.

(10) Patent No.: US 8,275,480 B2
(45) Date of Patent: Sep. 25, 2012

(54) METHODS AND SYSTEMS FOR TRANSPORTING PARTS FROM A PRIMARY PROCESS TO A SECONDARY PROCESS IN A FIRST IN, FIRST OUT FASHION

(75) Inventors: Brian Hons Smith, San Antonio, TX (US); Gary VanGorp, Harrodsburg, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 464 days.

(21) Appl. No.: 12/619,804

(22) Filed: Nov. 17, 2009

(65) Prior Publication Data

US 2011/0118869 A1    May 19, 2011

(51) Int. Cl.
*G06F 7/00*     (2006.01)
*B65G 59/00*    (2006.01)
*B65G 57/00*    (2006.01)
*B65G 57/26*    (2006.01)
*B65G 1/18*     (2006.01)

(52) U.S. Cl. ........ 700/218; 700/214; 700/216; 700/220; 414/788.7; 414/789.9; 414/791.9; 414/799

(58) Field of Classification Search ........................ None
See application file for complete search history.

(56) References Cited

U.S. PATENT DOCUMENTS

| | | |
|---|---|---|
| 5,315,094 A | 5/1994 | Lisy |
| 5,980,183 A | 11/1999 | Fosnight |
| 6,579,052 B1 | 6/2003 | Bonora et al. |
| 6,615,091 B1 | 9/2003 | Birchenough et al. |
| 2004/0006415 A1 | 1/2004 | Kang |
| 2004/0006416 A1 | 1/2004 | Jeong |
| 2006/0280581 A1* | 12/2006 | Castegren ............... 414/267 |
| 2007/0128007 A1* | 6/2007 | Bonora et al. .......... 414/217 |

* cited by examiner

*Primary Examiner* — Gene Crawford
*Assistant Examiner* — Yolanda Jones
(74) *Attorney, Agent, or Firm* — Dinsmore & Shohl LLP

(57) ABSTRACT

A method for management of first in, first out stores is provided. The method includes producing parts at a primary process. The parts are processed at a secondary process. A storage region is provided that includes at least one store lane pair including a first store lane and a second store lane. The first store lane includes a pick side, a drop side and a plurality of receiving volumes extending from the pick side to the drop side. The second store lane includes a pick side, a drop side and a plurality of receiving volumes extending from the pick side to the drop side. The receiving volumes of the first store lane are filled with the parts in the order they are produced at the primary process in a first in, first out fashion from the pick side of the first store lane to the drop side of the first store lane using an automated guided vehicle sized and configured to pass through each of the plurality of receiving volumes. After a last receiving volume nearest the drop side of the first store lane is filled, the receiving volumes of the second store lane are filled using the automated guided vehicle.

16 Claims, 11 Drawing Sheets

METHODS AND SYSTEMS FOR TRANSPORTING PARTS FROM A PRIMARY PROCESS TO A SECONDARY PROCESS IN A FIRST IN, FIRST OUT FASHION

TECHNICAL FIELD

The present specification generally relates to methods and systems for transporting parts from a primary process to a secondary process in a first in, first out fashion.

BACKGROUND

First in, first out (FIFO), in a manufacturing context, often means that parts are processed in the order that they are received. It is known, for example, to load a storage shelf from front-to-back with parts of increasing age moving from back-to-front. A person may then pick the parts from the front of the storage shelf for further processing. Picking from the front of the storage shelf can ensure that the older parts are picked before the newer parts. While the picking of parts may be accomplished manually, steps in various manufacturing processes are becoming increasingly automated. Thus, it would be desirable to provide methods and systems for automated management of first in, first out stores.

SUMMARY

In one embodiment, a method for management of first in, first out stores includes producing parts at a primary process; processing the parts at a secondary process; providing a storage region including at least one store lane pair including a first store lane and a second store lane, the first store lane including a pick side, a drop side and a plurality of receiving volumes extending from the pick side to the drop side, the second store lane including a pick side, a drop side and a plurality of receiving volumes extending from the pick side to the drop side; and filling the receiving volumes of the first store lane with the parts in the order they are produced at the primary process in a first in, first out fashion from the pick side of the first store lane to the drop side of the first store lane using an automated guided vehicle sized and configured to pass through each of the plurality of receiving volumes, wherein after a last receiving volume nearest the drop side of the first store lane is filled, filling the receiving volumes of the second store lane using the automated guided vehicle.

In another embodiment, a system for transporting parts from a primary process to a secondary process in a first in, first out fashion includes a plurality of automated guided vehicles including at least a first automated guided vehicle in a primary loop associated with the primary process and a second automated vehicle in a secondary loop associated with the secondary process. A first store lane has a first pick end, a first drop end and a plurality of first receiving volumes from the first pick end to the first store end. The first automated guided vehicle is used to fill the first store lane with the parts from the first pick end to the first drop end and the second automated guided vehicle is used to remove the parts from the first store lane from the first pick end to the first drop end. A second store lane has a second pick end, a second drop end and a plurality of second receiving volumes from the second pick end to the second store end. The first automated guided vehicle used to fill the second store lane with the parts from the second pick end to the second drop end and the second automated guided vehicle used to remove the parts from the second store lane from the second pick end to the second drop end. A master controller includes logic that toggles the first automated guided vehicle from the first store lane to the second store lane based on an update received from the first automated guided vehicle indicating that a last first receiving volume of the first store lane nearest the first drop side is filled.

In another embodiment, an automated guided vehicle implemented method of detecting a cart in a store lane for a first in, first out supply process includes following a detectable path into the store lane having a plurality of cart receiving areas extending from a pick side of the store lane to a drop side of the store lane; entering a first cart receiving area; detecting a first command marker in the first cart receiving area; and determining presence of a cart in an adjacent, second cart receiving area located nearer the pick side once the first command marker is detected.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein refer to methods and systems for automated management of first in, first out (FIFO) stores between manufacturing process steps. Generally, the methods and systems utilize a primary loop where filled carts are loaded into store lanes and a secondary loop where the filled carts are pulled from the store lanes. Automated guided vehicles (AGVs) may be used to load filled carts into store lanes and to also pull filled carts, in a FIFO fashion, from the store lanes. Various embodiments of the methods and systems for automated management of FIFO stores will be described in more detail herein.

I. System Overview

Figure 1:
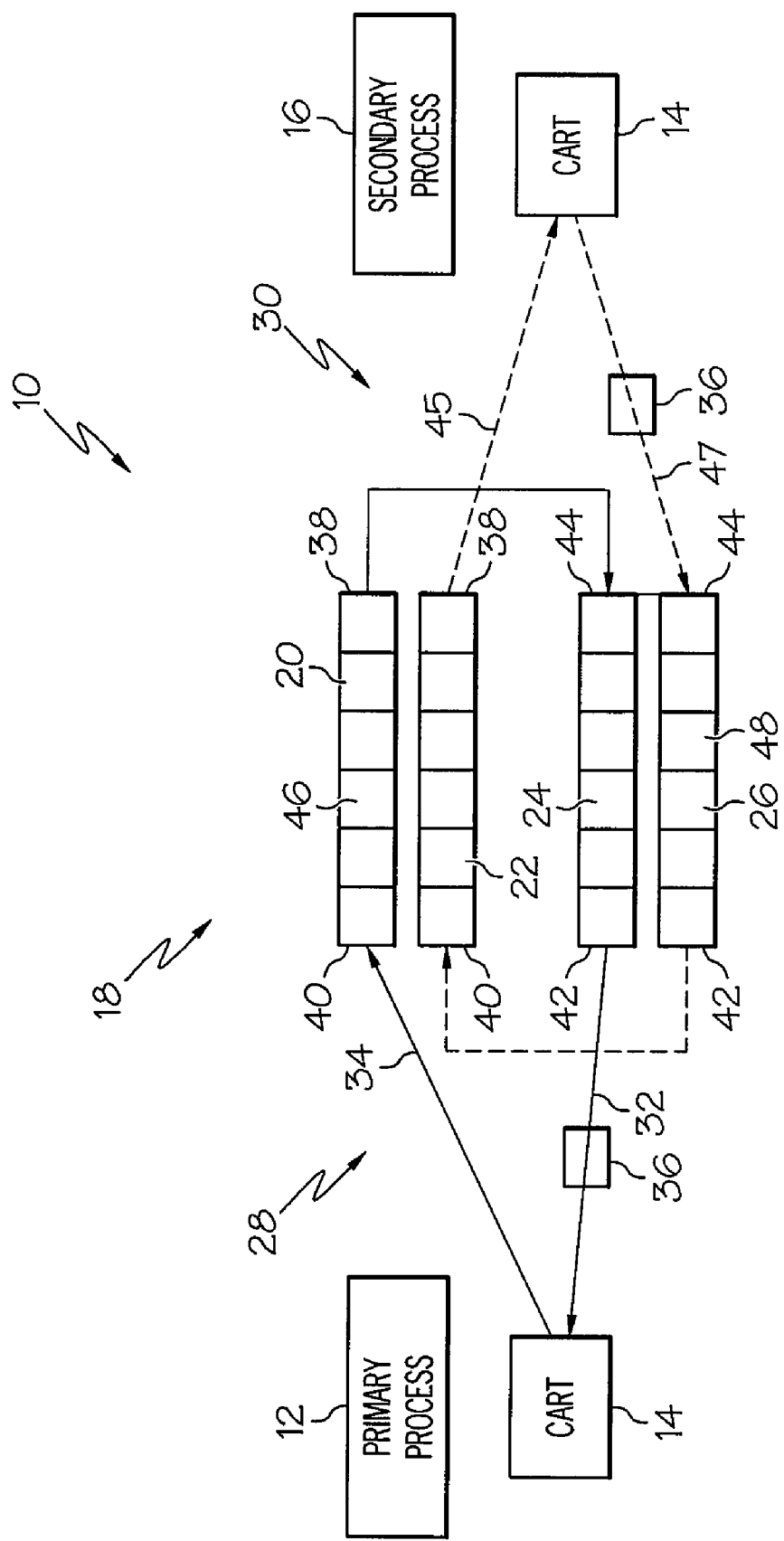
FIG. 1 is a diagrammatic, simplified view of a method and system for automated management of first in, first out stores between manufacturing process steps according to one or more embodiments shown and described herein.

Referring to FIG. 1, a simplified view of an exemplary system 10 for automated management of FIFO stores generally includes a primary process 12 where empty carts 14 are filled, for example, with parts produced at the primary process 12 and a secondary process 16 where the parts are removed from the carts 14 and, for example, further processed or used to make different parts. Between the primary process 12 and the secondary process 16 is a temporary storage region 18 that includes individual store lanes 20, 22, 24 and 26. In the exemplary embodiment of FIG. 1, store lanes 20 and 22 are designated to receive filled carts 14 from the primary process 12 while store lanes 24 and 26 are designated to receive empty carts 14 from the secondary process 16.

The system 10 may include a primary loop, generally designated as element 28, and a secondary loop, generally designated as element 30. In the primary loop 28, empty carts 14 are picked from the store lanes 24 and 26 using the AGVs 36 and transported to the primary process 12, as indicated by the solid line 32. At the primary process 12, the carts 14 may be filled with the parts produced at the primary process 12. The filled carts 14 may then be transported in the primary loop 28 from the primary process 12 to the store lanes 20 or 22 using the AGVs 36, as indicated by the solid line 34.

The store lanes 20 and 22 may include a pick side 38 and a drop side 40. In the illustrated embodiment, the pick side 38 of each store lane 20 and 22 is positioned nearest the secondary process 16 and the drop side 40 of each store lane 20 and 22 is positioned nearest the primary process 12, however, any other suitable arrangement may be used. The store lanes 24 and 26 also include a pick side 42 and a drop side 44. The pick side 42 of each store lane 24 and 26 may be positioned nearest the primary process 12 and the drop side 44 may be positioned nearest the secondary process 16, however, like the store lanes 20 and 22, any other suitable arrangement may be used.

The AGVs 36 may be used in the primary loop 28 to pull the empty carts 14 from the store lanes 24 and 26 and to fill the store lanes 20 and 22 with the filled carts 14. Each store lane 20 and 22 may include a number of designated cart receiving areas 46 arranged to receive one or more of the filled carts 14. In the illustrated embodiment, each cart receiving area 46 is sized to receive one filled cart 14, however, other arrangements are contemplated. In some embodiments, each AGV 36 on the primary loop 28 fills one of the store lanes 20 or 22 from the pick side 38 to the drop side 40 with the filled carts 14. The AGVs 36 on the primary loop 28 may fill one of the store lanes 20 or 22 until capacity for that store lane 20 or 22 is reached (or until the last cart receiving area 46 on the drop side 40 is filled). As will be described in greater detail below, when capacity for the store lane 20 or 22 is reached, a signal may be sent to the AGVs 36 that the last cart receiving area 46 nearest the drop side 44 is filled and the AGVs 36 on the primary loop may begin filling the other of the store lanes 20 or 22 from the pick side 38 to the drop side 40.

In addition to filling the store lanes 20 and 22 with filled carts 14, the AGVs 36 in the primary loop 28 also pull empty carts 14 from the store lanes 24 and 26. Similar to the store lanes 20 and 22, each store lane 24 and 26 may include a number of designated cart receiving areas 48 arranged to receive one or more of the empty carts 14. In the illustrated embodiment, each cart receiving area 48 is sized to receive one empty cart 14, however, other arrangements are contemplated. In some embodiments, each AGV 36 on the primary loop 28 pulls one of the empty carts 14 from one of the store lanes 24 or 26 from the pick side 42 to the drop side 44 and transports the empty cart 14 to the primary process 12. When the last empty cart 14 for one of the store lanes 24 and 26 has been picked from the cart receiving area 48 nearest the drop side 44 of the particular store lane 24 or 26, a signal may be sent to the AGVs 36 on the primary loop 28 and the AGVs 36 may begin pulling empty carts 14 from the other of the store lanes 24 or 26 from the pick side 42 to the drop side 44.

While the AGVs 36 are filling the store lanes 20 and 22 in the primary loop 28, the AGVs 36 in the secondary loop 30 may be used to pull the filled carts 14 from the store lanes 20 as indicated by dotted line 45 and to fill the store lanes 24 and 26 with the empty carts 14 as indicated by dotted line 47. In some embodiments, each AGV 36 on the secondary loop 30 pulls filled carts 14 from one of the store lanes 20 or 22 from the pick side 38 to the drop side 40. The AGVs 36 on the secondary loop 30 may pull filled carts 14 from one of the store lanes 20 or 22 until the last filled cart 14 from the last receiving area 46 nearest the drop side 40 is removed. When the last filled cart 14 from the last receiving area nearest the drop side 40 is removed, a signal may be sent to the AGVs 36 that the last filled cart 14 from the last cart receiving area 46 nearest the drop side 44 is removed and the AGVs 36 on the secondary loop 30 may begin pulling filled carts 14 from the other of the store lanes 20 or 22 from the pick side 38 to the drop side 40.

In addition to pulling filled carts 14 from the store lanes 20 and 22, the AGVs 36 in the secondary loop 30 also fill the store lanes 24 and 26 with empty carts 14. In some embodiments, each AGV 36 on the secondary loop 30 places one of the empty carts 14, emptied at the secondary process 16, in one of the store lanes 24 or 26 from the pick side 42 to the drop side 44. When the last cart receiving area 48 nearest the drop side 44 for one of the store lanes 24 and 26 has been filled with an empty cart 14, a signal may be sent to the AGVs 36 on the secondary loop 30 and the AGVs 36 may begin filling the other of the store lanes 24 or 26 from the pick side 42 to the drop side 44 with the empty carts 14.

Figure 2:
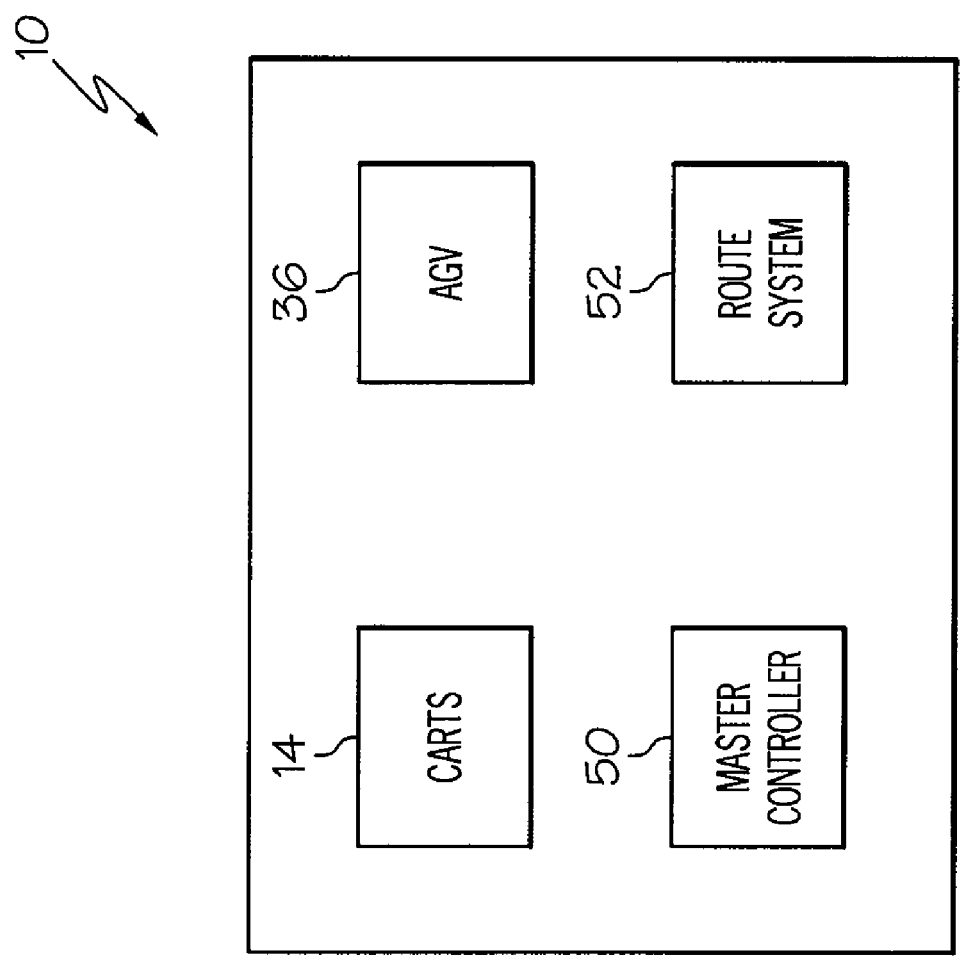
FIG. 2 is a schematic view of the subsystems of the system of FIG. 1 according to one or more embodiments shown and described herein.

Referring to FIG. 2, as may be appreciated, the system 10 may be divided into four primary subsystems: carts 14, AGVs 36, a master controller 50 and route system 52 for the AGVs 36. Generally, the carts 14 allow for moveable part storage and handling. The AGVs 36 may contain logic and control systems necessary to pick-up, move and drop-off the carts 14. The master controller 50 may contain logic and control systems necessary for the AGVs 36 to communicate. The route system 52 may include the hardware (e.g., located on the floor) that controls travel and interaction of the AGVs 36. Each primary subsystem 14, 36, 50 and 52 will be discussed in turn below.

II. Carts

Figure 3:
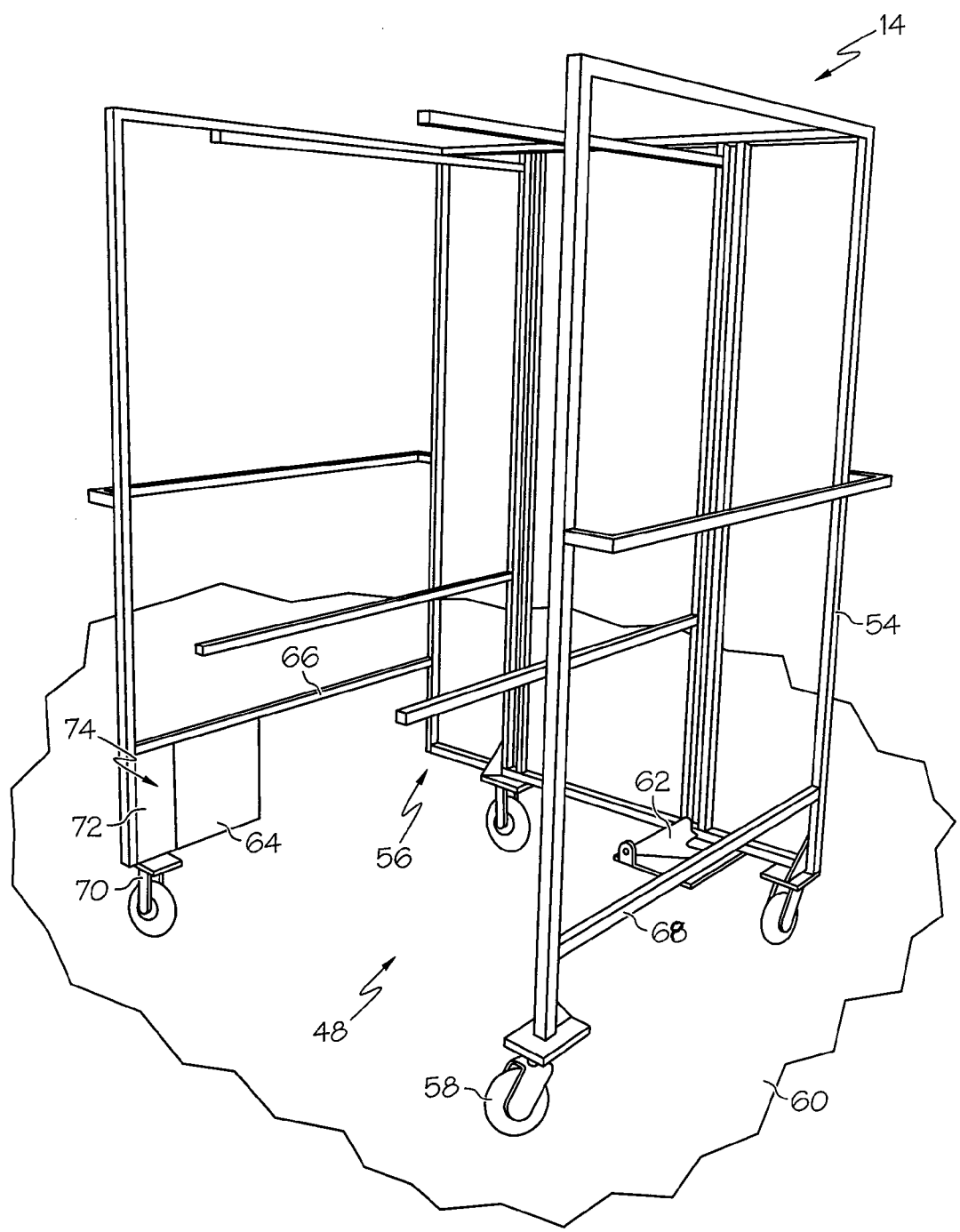
FIG. 3 is a perspective view of a cart for use in the system of FIG. 1 according to one or more embodiments shown and described herein.
Figure 4:
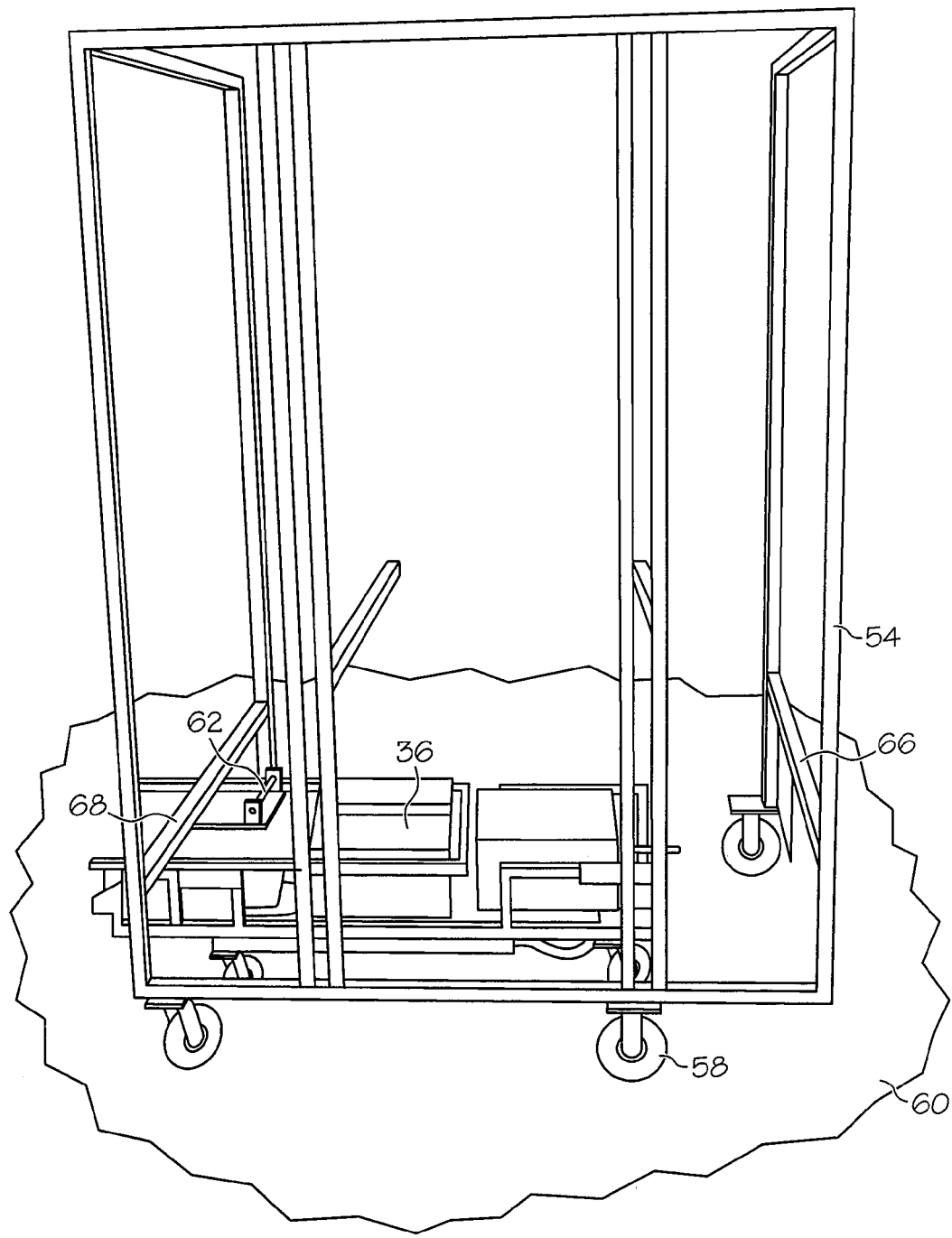
FIG. 4 is a side view of the cart of FIG. 3 with an automated guided vehicle hitched thereto according to one or more embodiments shown and described herein.

Referring to FIGS. 3 and 4, one exemplary embodiment of an empty cart 14 is shown. While carts 14 may be of any suitable design, the cart 14 includes a frame 54 and a support 56 carried by the frame 54 upon which the parts may rest. Wheels 58 are provided on the frame 54 that allow the cart 14 to be easily moved on the floor 60 from one location to another. The carts 14 may generally perform four functions: they freely roll, they have the support 56 for storing the parts, they have one or more hitch mechanisms 62 for the AGVs 36 to engage and they include one or more detectable features 64 that can be detected by the AGVs 36. In some embodiments, the carts 14 are sized and configured such that the AGVs 36 can drive underneath the carts 14. In these embodiments, lowermost support bars 66 and 68 may be spaced vertically from the floor 60 a distance that allows the AGVs 36 to drive thereunder, down the store lanes 20, 22, 24 and 26. The cart 14 may also be sized and configured to fit within one of the cart receiving areas 48.

The detectable feature 64 is used by the AGVs 36 to detect the presence of the cart 14 in the store lane 20, 22, 24 and 26. The position of the detectable feature 64 (e.g., to one side, inside wheel mounting plate 70) may also be used by the AGVs 36 to position the AGVs 36 for a hitching operation, in some embodiments, at the centerline of the cart 14. In this exemplary embodiment, the detectable feature 64 is a placard (e.g., 11 inches tall by 12 inches wide) that hangs downwardly from the support bar 66. Another placard 72 may also be used to cover a remaining opening 74 between the wheel mounting plate 70 and the support bar 66.

Figure 5:
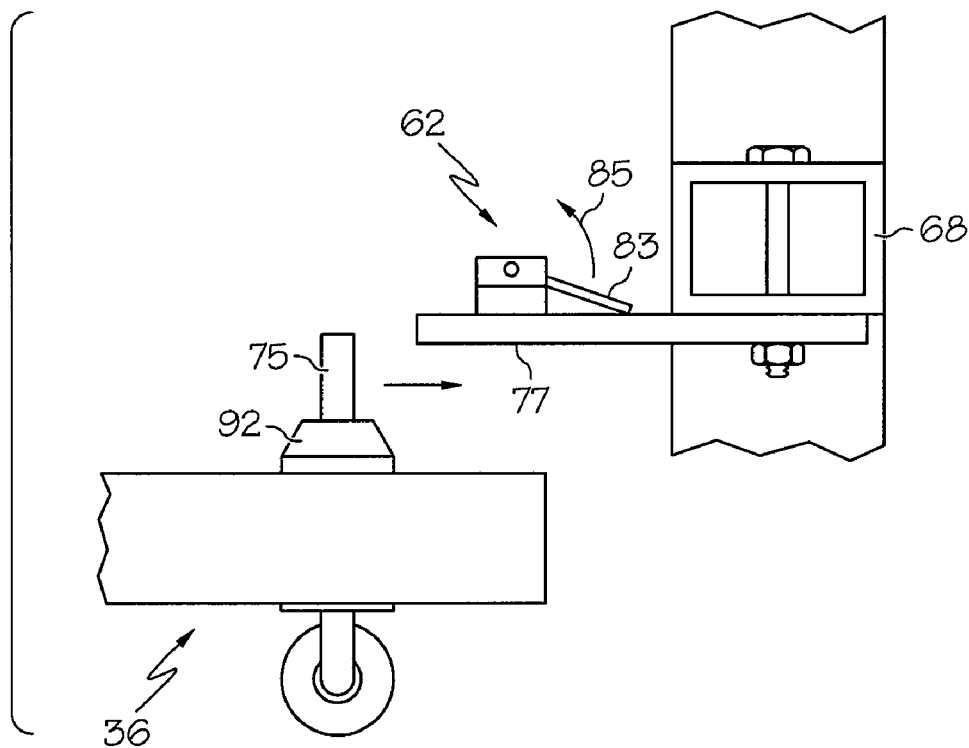
FIG. 5 is a side, section view of a latching mechanism for use in hitching to an automated guided vehicle according to one or more embodiments shown and described herein.
Figure 6:
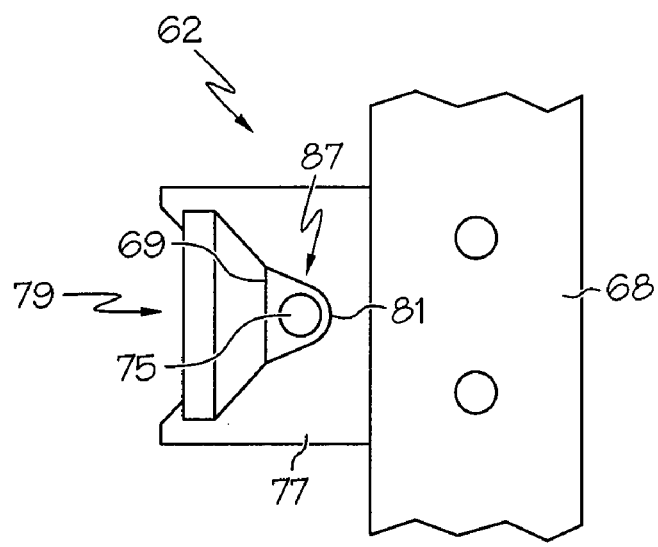
FIG. 6 is a top view of the latching mechanism of FIG. 5 according to one or more embodiments shown and described herein.

Referring now to FIGS. 5 and 6, an exemplary self-aligning hitch mechanism 62 for use in hitching with an extended pin 75 of a pin actuator 92 (e.g., a pneumatic or hydraulic pin actuator) includes a pin receiving plate 77 that may be mounted substantially horizontally to the lowermost support bar 68, facing inwardly toward the opposite lowermost support bar 66. The pin receiving plate 77 includes a generally U-shaped opening 79 that tapers toward a rounded edge 81. A pivotable locking member 83 is pivotally connected to the pin receiving plate 77. The locking member 83 can temporarily pivot upwardly in the direction of arrow 85 to allow the pin 75 to be received at a nose portion 87 of the opening 79. Once the pin 75 clears an end 89 of the locking member 83, the locking member 83 can pivot downwardly, capturing the pin 75 between the rounded edge 81 and the end 89 of the locking member 83.

III. AGVs

Figure 7:
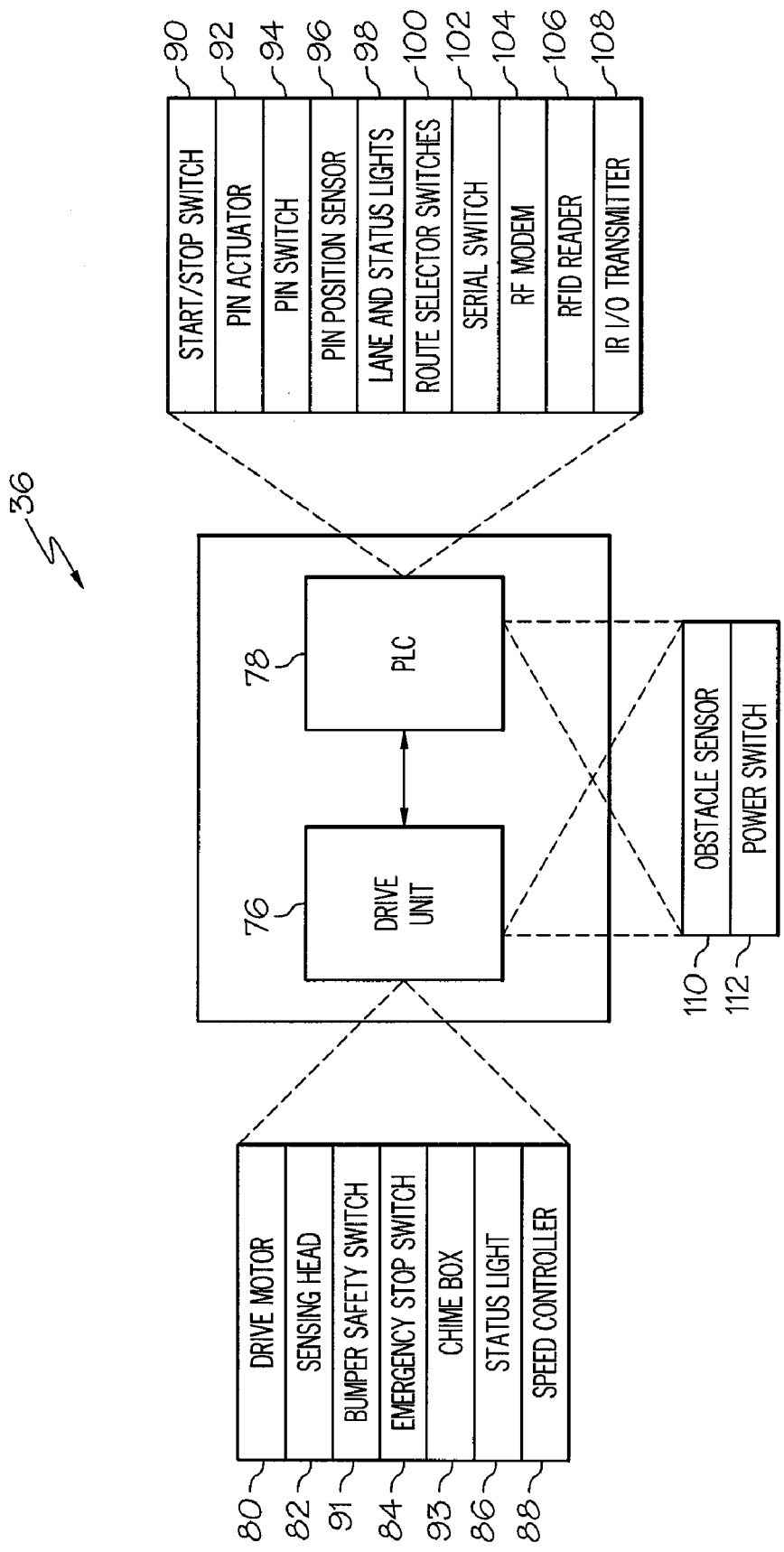
FIG. 7 is a schematic view of an automated guided vehicle for use in the system of FIG. 1 according to one or more embodiments shown and described herein.

Referring to FIG. 7, the AGVs 36 may be used to move the carts 14 from one location to another within the primary loop 28 and the secondary loop 30. Each AGV 36 generally includes a drive unit 76 that contains the driving controls and a programmable logic controller 78 (PLC) that contains communication and sensor controls. The drive unit 76 may control or provide a drive motor 80, a sensing head 82, a bumper safety switch 91, an emergency stop switch 84, a chime box 93, a status light 86 and a speed controller 88. The PLC 78 may control or provide a start/stop switch 90, the pin actuator 92, a pin switch 94, a pin position sensor 96, lane and status lights 98, route selector switches 100, a serial switch 102, an RF modem 104, an RFID reader 106 and an IR I/O transmitter 108. Both the drive unit 76 and the PLC 78 may control or receive information from an obstacle sensor 110 and a power switch 112. The drive unit 76 and the PLC 78 also communicate to each other. The drive unit 76 may provide driving information (e.g., driving/not driving) and route detecting information (e.g., north/south tape detected) to the PLC 78.

The PLC 78 may provide turn information (e.g. right turn/no right turn) and speed setting information to the drive unit 76.

Figure 8:
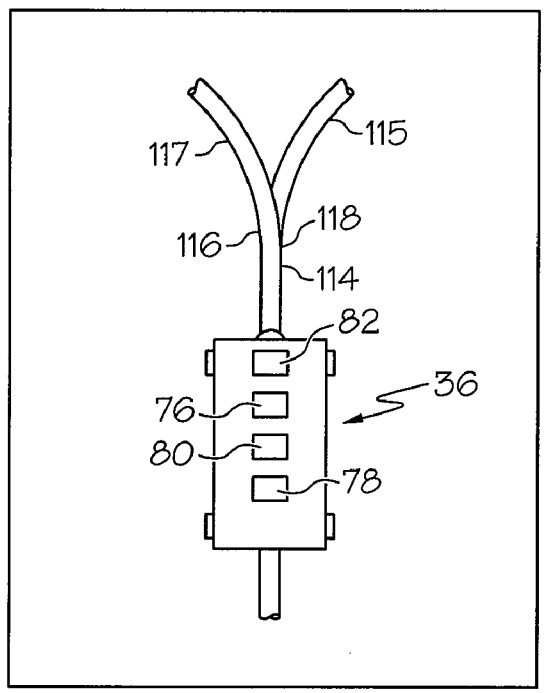
FIG. 8 is a diagrammatic top view of the automated guided vehicle of FIG. 7 following a path of a route system according to one or more embodiments shown and described herein.

Referring also to FIG. 8, generally, the AGV 36 may operate by following a preset route that is determined by magnetic tape 114 or other detectable path placed on the floor 60. The sensing head 82 may be used to detect the presence of the magnetic tape 114 and to guide the AGV 36 along the magnetic tape 114 using the drive motor 80. In some embodiments, by default, the sensing head 82 may follow the left edge 116 of the magnetic tape 114. To perform a turn, for example, to follow path 115 instead of path 117 the PLC 78 may provide an input to the drive unit 76, which switches the sensing head 82 to follow the right edge 118 of the magnetic tape 114, for example, for a preselected distance. Speed inputs may also be provided from the PLC 78 to the drive unit 76 to control speed of the drive motor 80, starting and stopping. More details regarding routes and operation of the AGV 36 will be described below.

Figure 9:
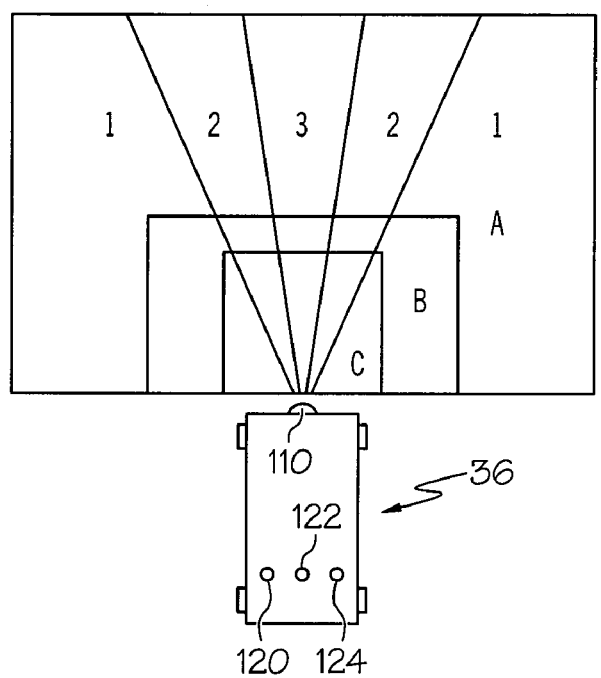
FIG. 9 is a diagrammatic top view of the automated guided vehicle of FIG. 8 illustrating view changes according to one or more embodiments shown and described herein.

Referring to FIG. 9, the AGV 36 includes the obstacle sensor 110 that may be used to detect when an object is within a detection zone. In some embodiments, the obstacle sensor 110 detects when an object is present within zones A, B and C. Lights 120, 122 and 124 may be used to indicate which zone the object is in. In the illustrated embodiment, when no lights 120, 122 and 124 are activated, the obstacle sensor 110 fails to detect an object. When one light 120 is activated, the obstacle sensor 110 detects an object in zone A. When two lights 120 and 122 are activated, the obstacle sensor 110 detects an object in zone B. When three lights 120, 122 and 124 are activated, the obstacle sensor 110 detects an object in zone C. As can be seen, zones B and C may be within zone A with zone C within zone B. In some embodiments, the PLC 78 receives the information from a zone A detection, while the drive unit 76 receives the information from zones B and C detections.

A variety of views (e.g., up to 15 or more) may be provided, for example, to tailor how much of the zones A, B and C are being observed during a particular operation. FIG. 9 illustrates an exemplary embodiment providing three different views 1, 2 and 3 where the zones A, B and C are subdivided, thereby eliminating a portion of the zones A, B and C being viewed. View 1 may include views 2 and 3 while view 2 includes view 3 and excludes view 1. View 3 may exclude views 1 and 2. Various suitable view settings may be applied. Providing different views can reduce instances where the AGVs 36 may slow or stop due to, for example, known, stationary obstacles or when the AGVs approach the carts 14 in one of the store lanes 20, 22, 24, 26. Any suitable view arrangement can be provided, for example, depending on the particular floor layout.

Figure 10:
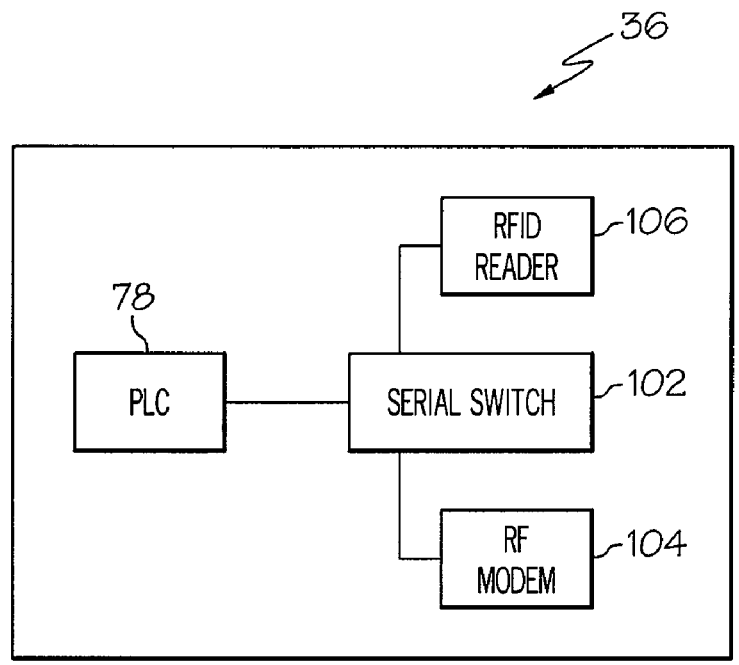
FIG. 10 is a schematic view of a communications system for use with the automated guided vehicle of FIG. 7 according to one or more embodiments shown and described herein.

FIG. 10 illustrates a basic, exemplary communications layout for the AGV 36. Each AGV 36 may include the serial switch 102, the RF modem 104, the RFID reader 106 and the PLC 78. The serial switch 102 may be used to allow the PLC 78 to send and receive data from the RF modem 104 and the RFID reader 106 on one serial line. The serial switch 102 may be buffered in both sending and receiving on all ports. When data is sent from the RFID reader 106 or from the RF modem to the serial switch 102, the data may first be stored in an input buffer. If the serial switch 102 is not sending any information to the PLC 78, the serial switch 102 will send the data from the buffer to the PLC 78. If another communications channel is opened when data is sent to the PLC 78, the serial switch 102 will hold the data in the input buffer until the channel is clear. Once the channel clears, the serial switch 102 will send the data to the PLC 78.

Three individual steps may be used to send information from the PLC 78 to either the RF modem 104 or the RFID reader 106. First, the PLC 78 may send a three byte preamble code to the serial switch 102 telling the serial switch 102 which device the PLC 78 wants to communicate with. This preamble code can open a direct connection between the PLC 78 and the RF modem 104 or the RFID reader 106. Second, the data may be sent. Any data sent once the preamble is sent will go directly to the selected the RF modem 104 or the RFID reader 106. The last step is to use another three byte preamble code to close the direct connection. Table I, below, is a list of exemplary serial switch preamble codes. Once a direct line is opened, all other data may be stored in the buffer of the serial switch 102 until the line is closed. If the preamble to close the direct line is never sent, the PLC 78 will not receive any data from the other devices.

TABLE I

Example Serial Switch Preamble Codes

| | Preamble | |
|---|---|---|
| Function | Hexadecimal | ASCII |
| Port A | 1B 02 41 | ESC STX 'A' |
| Port B | 1B 02 42 | ESC STX 'B' |
| Port C | 1B 02 43 | ESC STX 'C' |
| Port D | 1B 02 44 | ESC STX 'D' |
| Deselect All | 1B 02 04 | ESC STX EOT |

The serial switch 102 may be able to detect and analyze the preamble in real time. This can allow the three parts of the sending process to be accomplished with no time delay.

The RFID reader 106 is used to read RFID tags that may be embedded in the floor 60 (or some other suitable location) along, for example, the right side of the magnetic tape route. When the RFID reader 106 passes over an RFID tag, the RFID reader 106 may send a data packet (e.g., a nine byte packet) to the PLC 78. This packet may wait in the serial switch buffer until the PLC 78 is ready to receive it. An exemplary packet format is shown in Table II, below.

TABLE II

Example RFID Tag Read Data Packet with the Data Shown in Hexadecimal

| Header | | Length | Type | Tag Data | | Tag Series | Terminator |
|---|---|---|---|---|---|---|---|
| 02 | 02 | 00 | 04 | 0D | XX | XX | XX | 03 |

The two data bytes can tell the PLC 78 what tag it just read; this information may be used by the control logic of the PLC 78. The tag series byte tells the PLC 78 if the RFID tag is for the correct AGV system and may be stored in memory.

The AGV 36 may send and receive information about store lanes, lighting and traffic control wirelessly via the RF modem 104. The information flow route to the AGV 36, for example, from the master controller 50 may be RF modem 104 to serial switch 102 to PLC 78 for receiving data and PLC 78 to serial switch 102 to RF modem 104 for sending data, for example, from the AGV 36 to the master controller 50. When sending data, the program logic of the PLC 78 will develop a send packet. When the AGV 36 receives a master broadcast packet from the master controller 50 (discussed below), the packet is stored in an input buffer. The communications function may use a loop to parse the characters in the input buffer into an integer file. The rest of the program logic of the PLC 78 will then use the integers to make driving decisions.

When the AGV 36 notices a state change condition, the AGV 36 may send an update to the master controller 50 via the RF modem 104. The master controller 50 then takes the updated information from the AGV 36 and modifies a broadcast packet accordingly. The master controller 50 broadcast packet is then sent. There may two (or more) packet formats for the RF communications. An exemplary master broadcast packet is detailed in Table III.

TABLE III

Master Broadcast Packet with the Data shown in Hexadecimal.

| Information | Data | Index | ST: | N: |
|---|---|---|---|---|
| MC | 4D 43 | 1 | 16 | N/A |
| FLAME LANE 1 OR 2 | 31 | 3 | 17 | 2 |
| FLAME LANE 3 OR 4 | 33 | 4 | 18 | 3 |
| FLAME LANE 5 OR 6 | 35 | 5 | 19 | 4 |
| FLAME LANE 7, 8, OR 9 | 37 | 6 | 20 | 5 |
| FLAME LANE 10 OR 11 | 31 30 | 7 | 21 | 6 |
| NULL | 30 30 | 9 | 22 | 7 |
| PROCESS LANE 1 OR 2 | 31 | 11 | 23 | 11 |
| PROCESS LANE 3 OR 4 | 33 | 12 | 24 | 12 |
| PROCESS LANE 5 OR 6 | 35 | 13 | 25 | 13 |
| PROCESS LANE 7, 8, OR 9 | 37 | 14 | 26 | 14 |
| PROCESS LANE 10 OR 11 | 31 30 | 15 | 27 | 15 |
| NULL | 30 30 | 17 | 28 | 16 |
| NEED VENZA | 30 | 19 | 29 | 9 |
| STX | 3 | 20 | N/A | N/A |

An exemplary AGV update packet is detailed in Table IV.

TABLE IV

An Example an AGV Update Packet

| | Header | | AGC | Key | Data | | Terminator |
|---|---|---|---|---|---|---|---|
| Hexadecimal | 53 | 52 | XX | XX | XX | XX | 03 |
| ASCII | S | R | XX | XX | XX | XX | ETX |

The master broadcast packet is sent by the master controller 50 to all of the AGVs 36 in the system 10. This master broadcast packet may be broadcast, for example, roughly once a second to ensure all the AGVs 36 have the same information. The AGV update packet is sent from the AGV 36 directly to the master controller 50. The AGVs 36 may not communicate together directly; they may only communicate through the master controller 50. The configuration of the RF modems 104 allows for basic packet filtering, which may ensure the AGVs 36 do not get packets from each other.

The AGV 36 uses acknowledged communications for the update packets, which may improve packet transmission reliability. When the AGV 36 sends information to the master controller 50, the AGV 36 will build and send the update packet. After the update packet has been sent, the AGV 36 may, in some embodiments, wait for a predetermined period of time (e.g., 1.75 seconds) for an acknowledged response from the master controller 50. If a timeout is reached, the AGV 36 will resend the update packet. After, for example, five unacknowledged sends, the AGV 36 may fault with a communications error.

IV. Master Controller

The master controller 50 may be the central communication hub of the system 10. The master controller 50 may include logic for performing three primary functions: updating lane status for the AGVs 36, aisle lighting and performing traffic control. Updating lane status will be focused on here. The master controller 50 uses broadcast packets to direct the AGVs 36 to a designated lane and to provide FIFO storage control.

Figure 11:
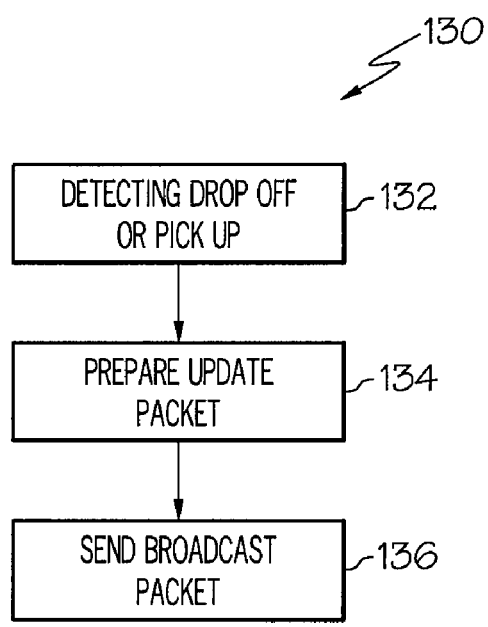
FIG. 11 illustrates a method for managing lane status of the automated guided vehicle of FIG. 7 according to one or more embodiments shown and described herein.

Referring to FIG. 11, a process 130 for managing lane status of the AGVs 36 includes each AGV 36 detecting that the AGV 36 dropped off or picked up a cart 14 in the last cart receiving area 46, 48 in a particular store lane 20, 22, 24, 26 at step 132. The AGV 36 may then prepare and send an update packet to the master controller 50 at step 134, as discussed above indicating such a drop off or pick up. The store lanes may be grouped into pairs (e.g., see store lanes 20, 22 and store lanes 24, 26 of FIG. 1) such that when one store lane becomes full or empty, the master controller 50 will toggle the AGVs 36 to the other store lane of the pair using an updated broadcast packet sent to all the AGVs 36 at step 136.

V. Route System

Figure 12:
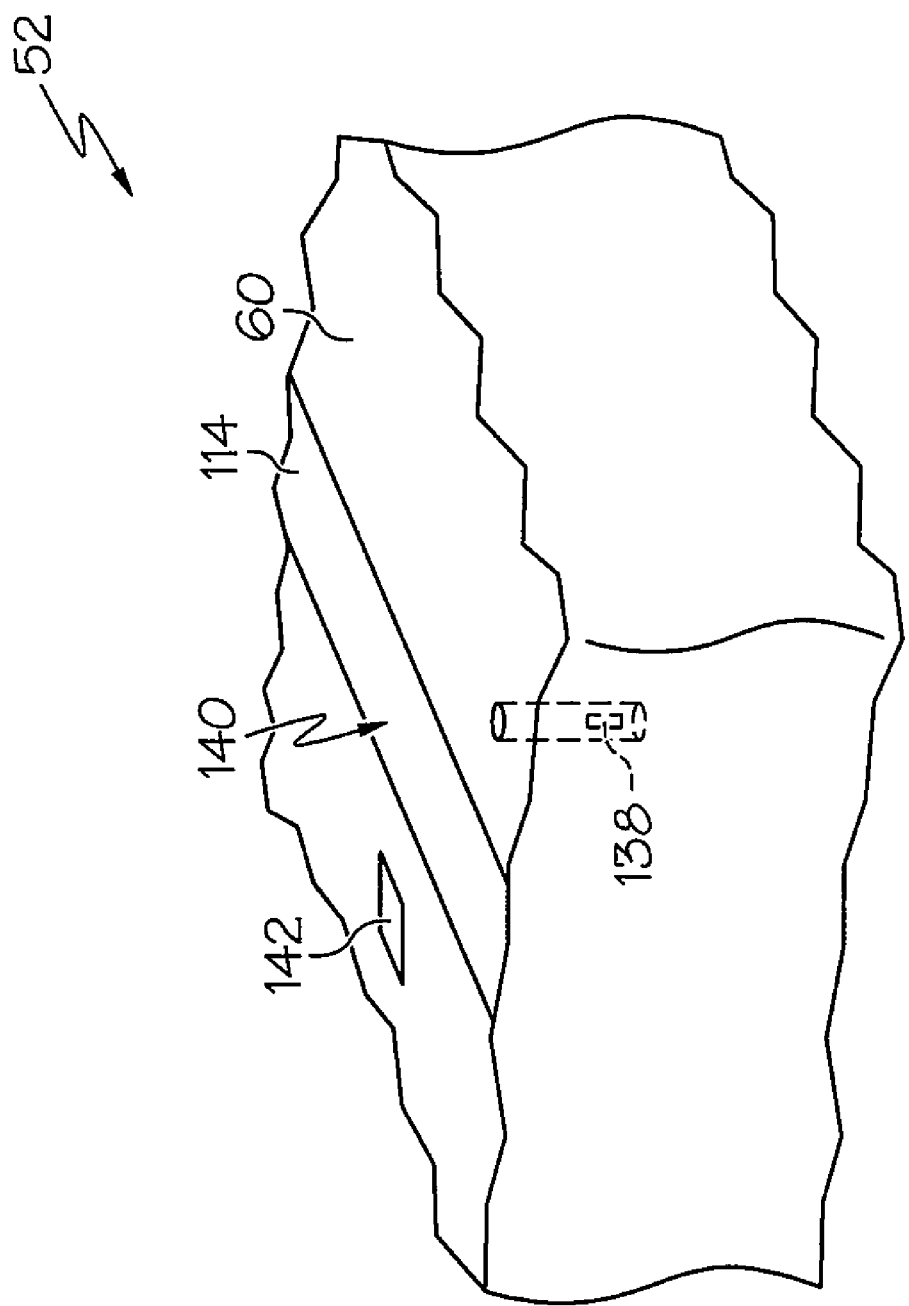
FIG. 12 illustrates a portion of a route system according to one or more embodiments shown and described herein.

Referring to FIG. 12, a portion of an exemplary route system 52 generally includes a path indicator (e.g., the magnetic tape 114) and the position indicators (e.g., the RFID tags 138). In embodiments utilizing the magnetic tape 114, the magnetic tape 114 may be itself a permanent magnet with an upper north pole side 140 and a lower south pole side facing the floor 60. The south pole side of the magnetic tape 114 may have an adhesive backing, which allows the magnetic tape 114 to adhere to the floor 60. While the north pole side 140 is illustrated facing up, in other embodiments, the north pole side 140 may face the floor 60. Additionally, the north pole side 140 may include the adhesive backing. Generally, the magnetic tape 114 sets the routes that the AGVs 36 will follow using the sensing head 82.

In various places along the various routes, there may be discrete strips of command magnetic tapes 142 oriented at an angle (e.g., substantially perpendicular) to the magnetic tape 114. As one exemplary embodiment, the command magnetic tapes 142 may between about two to five inches in length, be placed in a perpendicular orientation to the magnetic tape 114 and spaced between about three and five inches from the magnetic tape 114. The sensing head 82 may be configured to detect the command magnetic tapes 142 and send tape information to the PLC 78 of the presence of the command magnetic tapes 142 and also whether the command magnetic tape 142 is north pole up or south pole up. Such tape information can be used by the PLC 78 in determining control commands.

The RFID tags 138 provide information to the AGV 36 regarding location in its selected route. The RFID tags 138 may be embedded in the floor 60, e.g., by drilling a hole and filling the hole with epoxy or other suitable material. Embedding the RFID tag 138 in the floor can make the RFID tag 138 a permanent part of the floor 60 and help protect the RFID tag 138 from damage. Each RFID tag 138 may have, for example, two or more bytes of information that can be used by the AGVs 36. Two of the bytes, for example, may be data bytes that indicate where the AGV is currently located in the route system 52.

VI. Exemplary System Operation

Figure 13:
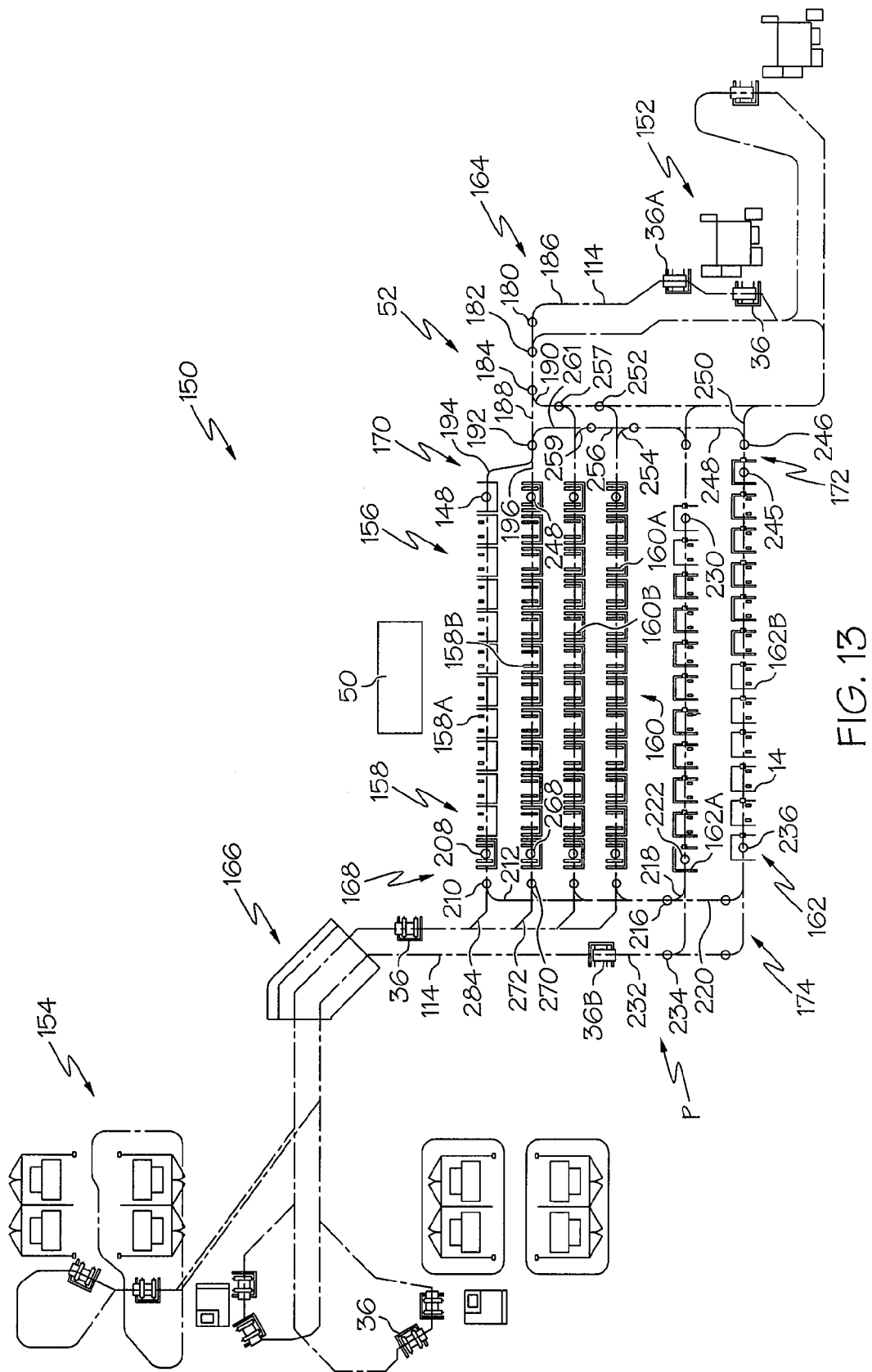
FIG. 13 illustrates a plan view of method and system for automated management of first in, first out stores between manufacturing process steps according to one or more embodiments shown and described herein.

Referring now to FIG. 13, operation of an exemplary system 150 utilizing the carts 14, AGVs 36, master controller 50 and route system 52 includes one or more primary processes 152 and one or more secondary processes 154. As above with FIG. 1, the carts 14 are filled with parts at the primary processes 152 that are required for further manufacturing steps at the secondary processes 154. Between the primary processes 152 and the secondary processes 154 is a temporary storage region 156 that includes a first store lane pair 158, a second store lane pair 160 and a third store lane pair 162. In the exemplary embodiment of FIG. 11, the store lane pair 158 is designated to receive carts 14 filled with a first part from the primary processes 152 while the store lane pair 160 is designated to receive carts filled with a second, different part from the primary processes 152. The store lane pair 162 is designated to receive empty carts 14 from the secondary processes 154. Each store lane pair 158, 160 and 162 includes a primary store lane 158A, 160A and 162A and a secondary store lane 158B, 160B and 162B. In the illustrated embodiment, there may be only one store lane pair 162 for the empty carts 14 because both of the first and second parts utilize the same type of cart. Other arrangements are possible such as multiple empty cart store lane pairs depending, for example, on the number of different parts and cart types being utilized.

The system 150 may include a primary loop 164 and a secondary loop 166. In the primary loop 164, empty carts 14 are picked from the store lane pairs 158 and 160 using the AGVs 36 and transported to the primary processes 152. At the primary processes 152, the carts 14 may be filled with the first and second parts produced at the primary processes 152. The filled carts 14 may then be transported in the primary loop 164 from the primary processes 152 to the store lane pairs 158 and 160 using the AGVs 36.

The store lane pairs 158 and 160 may each include a pick side 168 and a drop side 170. In the illustrated embodiment, the pick side 168 of each store lane pair 158 and 160 is positioned nearest the secondary processes 154 and the drop side 170 of each store lane pair 158 and 160 is positioned nearest the primary processes 152, however, any other suitable arrangement may be used. The store lane pair 162 also includes a pick side 172 and a drop side 174. The pick side 172 of the store lane pair 162 may be positioned nearest the primary processes 152 and the drop side 174 of the store lane pair 162 may be positioned nearest the secondary processes 154, however, any other suitable arrangement may be used.

The AGVs 36 follow various paths (generally designated P), for example, defined by the elongated magnetic tape 114, to pull the empty carts 14 from the store lane pair 162 and to fill the store lane pairs 158 and 160 with the filled carts 14 in the primary loop 164. Each AGV 36 on the primary loop 164 fills one of the store lanes 158A, 158B, 160A, and 160B from the pick side 168 to the drop side 170 with the filled carts 14, depending, at least in part, on which route is selected for the AGV 36. For example, each AGV may include the route selector switch 100 (FIG. 4). The route selector switch 100 may allow the route for a particular AGV 36 to be manually selected, where each route is associated with a particular part (in this example, the first part and the second part). For example, the selector switch 100 may be a knob, buttons, etc. that allows operator input for choosing between supply route A and supply route B. Supply route A may be associated with the first parts and supplying the store lane pair 158 and supply route B may be associated with the second parts and supplying the store lane pair 160. Selection of either supply route A and supply route B using the route selector switch 100 may signal to the PLC 78 which set of drive commands to utilize in carrying out its operation. Once the supply route is selected using the route selector switch 100, the AGV may use the master broadcast packets from the master controller 50 and/or location information supplied by the RFID tags 138 to make driving decisions while following the magnetic tape path P.

For each store lane pair 158 and 160, the AGVs 36 on the primary loop 164 may fill one of the store lanes 158A or 158B, 160A or 160B until capacity for that store lane is reached (or until the last cart receiving area on the drop side 170 is filled). As discussed above, when capacity for the particular store lane 158A or 158B, 160A or 160B is reached, the AGV 36 filling the last cart receiving area sends an update package to the master controller 50. The master controller 50 may then send a master broadcast package instructing the AGVs 36 on the primary loop 164 assigned to the affected store lane pair to switch store lanes (e.g., from A to B or vice versa). The AGVs 36 on the primary loop 164 may then begin filling the other store lane of the affected store lane pair 158 or 160.

In addition to filling the store lane pairs 158 and 160 with filled carts 14, the AGVs 36 in the primary loop 164 also pull empty carts 14 from the store lane pair 162. In some embodiments, each AGV 36 on the primary loop 164 pulls one of the empty carts 14 from one of the store lanes 162A or 162B from the pick side 172 to the drop side 174 and transports the empty cart 14 to the primary processes 152. When the last empty cart 14 for one of the store lanes 162A or 162B has been picked from the cart receiving area nearest the drop side 174 of the particular store lane 162A or 162B, the AGV 36 emptying the last cart receiving area sends an update package to the master controller 50. The master controller 50 may then send a master broadcast package instructing the AGVs 36 on the primary loop 164 assigned to the affected store lane pair to switch store lanes (e.g., from A to B or vice versa). The AGVs 36 on the primary loop 164 may then begin pulling from the other store lane of the store lane pair 162.

While the AGVs 36 are filling the store lane pairs 158 and 160 in the primary loop 164, the AGVs 36 in the secondary loop 166 may be used to pull the filled carts 14 from the store lane pairs 158 and 160 and to fill the store lane pair 162 with the empty carts 14. Each AGV 36 on the secondary loop 166 pulls a filled cart 14 from one of the store lanes 158A, 158B, 160A, and 160B from the pick side 168 to the drop side 170, depending, at least in part, on which route is selected for the AGV 36. For example, each AGV 36 may include the route selector switch 100 (FIG. 4). The route selector switch 100 may allow the route for a particular AGV 36 to be manually selected, where each route is associated with a particular process, which is, in turn, associated with a particular part (in this example, the first part and the second part). The selector switch 100 may be a knob, buttons, etc. that allows operator input for choosing between process route A, process route B or process route C, for example. Selection of either process route A, process route B or process route C using the route selector switch 100 may signal to the PLC 78 which set of drive commands to utilize in carrying out its operation. Once the process route is selected using the route selector switch 100, the AGV 36 may use the master broadcast packets from the master controller 50 and/or location information supplied by the RFID tags 138 to make driving decisions while following the magnetic tape path P.

For each store lane pair 158 and 160, the AGVs 36 on the secondary loop 166 may pull filled carts 14 from one of the store lanes 158A or 158B, 160A or 160B until the last filled cart has been pulled (or until the last cart receiving area on the drop side 170 is emptied). As discussed above, when the last cart receiving area for the particular store lane 158A or 158B, 160A or 160B is emptied, the AGV 36 pulling the last cart 14 sends an update package to the master controller 50. The master controller 50 may then send a master broadcast package instructing the AGVs 36 on the secondary loop 166 assigned to the affected store lane pair to switch store lanes (e.g., from A to B or vice versa). The AGVs 36 on the secondary loop 166 may then begin removing filled carts 14 from the other store lane of the affected store lane pair 158 or 160.

In addition to pulling filled carts 14 from the store lane pairs 158 and 160, the AGVs 36 in the secondary loop 166 also fill the store lane pair 162 with empty carts 14. In some embodiments, each AGV 36 on the secondary loop 166 fills one of the store lanes 162A or 162B from the pick side 172 to the drop side 174 with empty carts. When the last cart receiving area has been filled nearest the drop side 174 of the particular store lane 162A or 162B, the AGV 36 filling the last cart receiving area sends an update package to the master controller 50. The master controller 50 may then send a master broadcast package instructing the AGVs 36 on the secondary loop 166 assigned to the affected store lane pair to switch store lanes (e.g., from A to B or vice versa). The AGVs 36 on the secondary loop 166 may then begin filling the other store lane of the store lane pair 162.

Now, an exemplary decision process for an AGV 36A on the primary loop 164 will be discussed with reference to FIG. 13. The AGV 36A, whose route has already been selected using the route selector switch 100, has its empty cart 14 filled at primary process 152 with parts formed at the primary process 152. The AGV 36 travels along the left edge of the magnetic tape 114 along path 186, as described above, until the AGV reads the RFID tag 180. RFID tag 180 provides information to the PLC 78 that the AGV 36A is approaching the lane pairs 158 and 160. The AGV continues to travel along the magnetic tape 114 until it reads the RFID tag 182, which provides information to the PLC 78 that the PLC used to change a view of the AGV 36 such that the AGV 36A can perform a lane operation. At the RFID tag 184, the path 186 of the splits into paths 188 and 190 and the RFID tag 184 provides information that allows the PLC 78 to decide whether to continue along the left side of the magnetic tape 114 along path 190 toward store lane pair 160 or to turn right to follow along the right side of the magnetic tape 114 along path 188 toward the store lane pair 158. The PLC 78, knowing the selected route from the route selector switch 100, uses the information provided by the RFID tag 184 to determine whether to continue along path 190 or to turn right and follow the path 188. In this example, for illustration, the AGV 36A turns right to follow the path 188 toward the store lane pair 158 until the AGV 36A reaches the RFID tag 192. The RFID tag 192 provides information that the path 188 splits into path 194 leading to the store lane 158A and into path 196 leading to the store lane 158B. The AGV 36A, knowing which store lane between 158A and 158B is active using the master broadcast packet from the master controller 50, uses the information provided by the RFID tag 192 to determine whether to continue along path 196 or to turn right and follow the path 194. In this example, the AGV 36A turns right to follow the path 194 (note that a last cart receiving area 197k of the store lane 158B is filled).

The PLC 78 of the AGV 36A, using information from the RFID tag 198, enters lane mode upon reading the RFID tag 198. The PLC 78, upon entering lane mode, may utilize either pin-up logic or pin-down logic in determining how to proceed based on whether the pin of the pin actuator 92 is in an extended or retracted position. The PLC 78 may determine whether the pin is currently extended or retracted using the pin position sensor 96 (FIG. 4). When the pin is extended, an assumption may be made by the PLC 78 that the AGV 36A is hitched to the cart 14.

Figure 14:
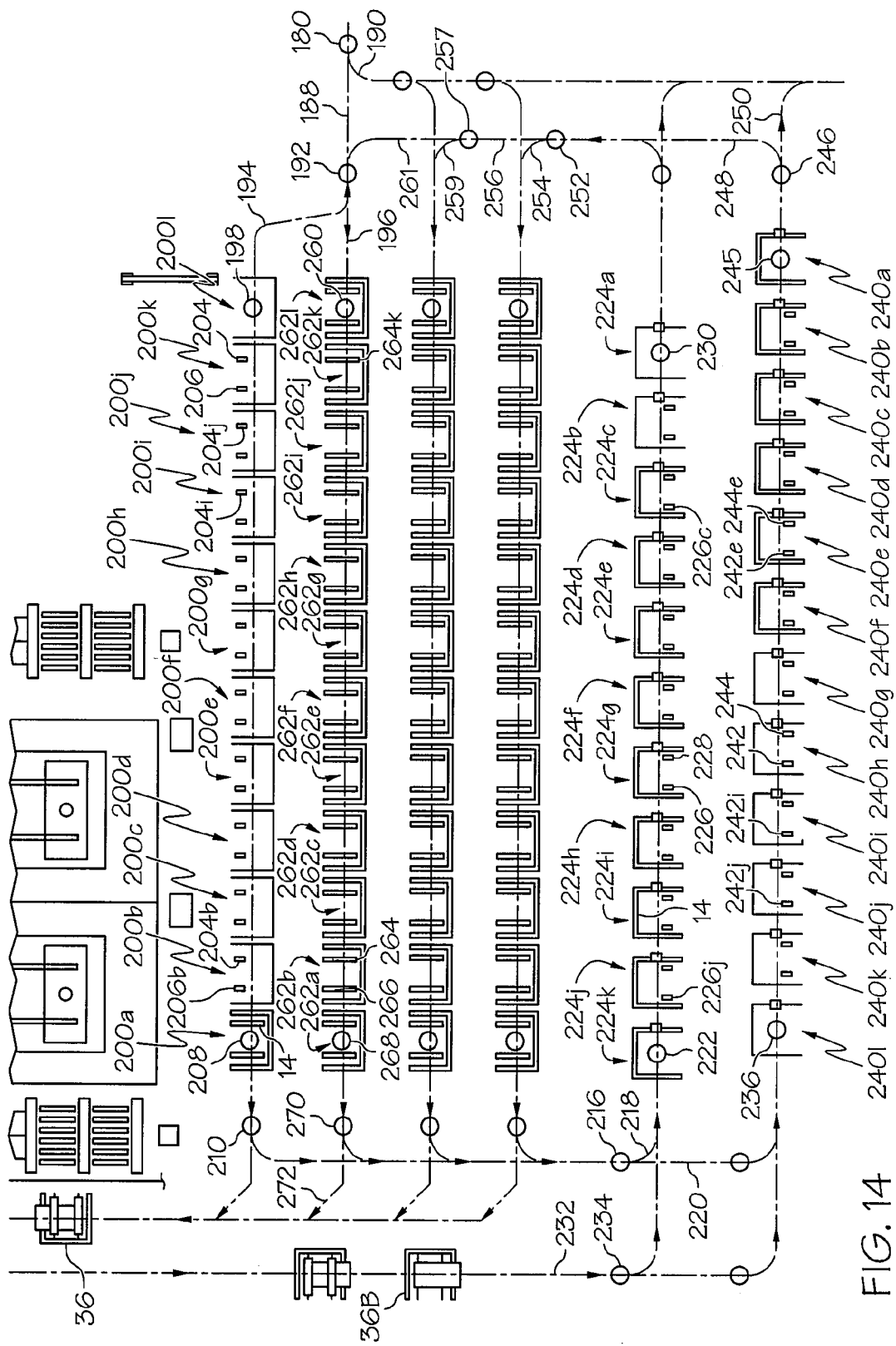
FIG. 14 illustrates a detailed view of the method and system of FIG. 13 according to one or more embodiments shown and described herein.

Referring also to FIG. 14 and noted above, the store lane 158A is divided into individual cart receiving areas 200a-200l. Each cart receiving area 200 may include a pair of command tapes: a south command tape 204 and a north command tape 206. When the south command tape 204 is detected using the sensing head 82, the PLC 78 sets a time window in which the AGV 36A looks for a cart 14 using the obstacle sensor 110. For example, as the AGV 36A enters the cart receiving area 200j, the south command tape 204j is detected. The obstacle sensor 110 may look in zone A, the largest zone, and the PLC 78 determines that no cart 14 is present in the cart receiving area 200i. Likewise, as the AGV 36 enters the adjacent cart receiving are 200i, the AGV 36A encounters the south command tape 204i and the PLC 78 determines no cart is present in the cart receiving area 200h using the obstacle sensor 110. The AGV 36A may look for a cart in an adjacent cart receiving area 200 every time a south command tape 204 is passed.

In the illustrated example, since only the first cart receiving area 200a is occupied by a cart 14, the AGV 36A will proceed in this fashion until the south command tape 204b is detected. When south command tape 204b is detected the PLC 78 detects the presence of the cart 14 using the obstacle sensor 110 and may slow down. The AGV 36A then looks for the north command tape 206b using the sensing head 82. When the north command tape 206b is detected, the AGV 36A stops and the PLC 78, according to the pin-up logic, causes pin actuator 92 to retract the pin, thereby unhitching to the cart 14 and leaving the cart 14 in the cart receiving area 200b. If the AGV 36A reaches the first cart receiving area 200a without retracting the pin (i.e., the store lane 158A is empty), the AGV 36A will retract the pin when the RFID tag 208 is detected indicating the first cart receiving area 200a location. Similarly, if the AGV 36A detects a cart 14 in the cart receiving area 200k upon reading the RFID tag 198, the pin will be retracted and the cart 14 will be dropped in cart receiving area 200l.

Once the pin is retracted, the AGV 36A travels under the cart 14, exits the store lane 158A and reads RFID tag 210. The RFID tag 210 provides information to the PLC 78 that the AGV 36A is approaching path pairs 212 and 214. The PLC 78, knowing the selected route from the route selector switch 100, uses the information provided by the RFID tag 210 to determine whether to continue along path 212 or to turn right and follow the path 214. In this example, the AGV 36A continues along path 212 toward the store lane pair 162 until the AGV 36A reaches the RFID tag 216. The RFID tag 216 provides information to the PLC 78 that the AGV 36A is approaching path pairs 218 and 220. The AGV 36A, knowing which store lane between 162A and 162B is active using the master broadcast packet from the master controller 50, uses the information provided by the RFID tag 192 to determine whether to continue along path 218 or to turn right and follow the path 220. In this example, the AGV 36A continues to follow the path 218 toward the store lane 162A.

The PLC 78 of the AGV 36A, using information from the RFID tag 222, enters lane mode upon reading the RFID tag 222. The PLC 78, upon entering lane mode, may now utilize the pin-down logic as the PLC 78 determines that the pin is currently retracted using the pin position sensor 96 (FIG. 4).

The store lane 162A is divided into individual cart receiving areas 224a-224k. Each cart receiving area 224 may include a pair of command tapes: a south command tape 226 and a north command tape 228. When the south command tape 226 is detected using the sensing head 82, the PLC 78 sets a time window in which the AGV 36A looks for a cart 14 using the obstacle sensor 110. For example, as the AGV 36A enters the cart receiving area 224j, the south command tape 226j is detected. The obstacle sensor 110 then may look in zone A and the PLC 78 may determine that a cart 14 is present in cart receiving area 224i. Likewise, as the AGV 36 enters the adjacent cart receiving area 224i, the AGV 36A encounters the south command tape 226i and the PLC 78 determines that a cart is present in the cart receiving area 224h using the obstacle sensor 110. The AGV 36A may look for a cart 14 in an adjacent cart receiving area 224 every time a south command tape 226 is passed.

In the illustrated example, since only the first cart receiving area 224a and the second cart receiving area 224b are unoccupied by a cart 14, the AGV 36A will proceed in this fashion until the south command tape 226c is detected. When south command tape 226c is detected, the PLC 78 detects the absence of a cart 14 using the obstacle sensor 110 and the AGV 36 may slow down. At this point, the PLC 78 may then extend the pin using the pin actuator 92, slow down and exit lane mode. The pin engages the self-aligning hitch 62, and the AGV 36A proceeds out of the store lane 162A with the empty cart hitched thereto. If the AGV 36A reaches the first cart receiving area 224a without extending the pin, the AGV 36A will extend the pin when the RFID tag 230 is detected indicating the first cart receiving area 224a location (if the cart 14 is detected upon approach). Similarly, if the AGV 36A detects absence of a cart 14 at the cart receiving area 224b upon reading the RFID tag 222, the pin may be extended to hitch to the empty cart 14 in the cart receiving area 224k (if the cart is detected). The AGV 36A with empty cart 14 in tow then returns to the primary process 152, again following location information from a number of RFID tags.

If the AGV 36A is in pin-down logic mode and fails to detect a cart 14 along the entire length of the store lane 162A (i.e., the store lane 162A is empty), the AGV 36A may enter lane bypass mode. In lane bypass mode, the AGV 36A may exit the store lane 162A and determine that the pin remains retracted. The AGV 36A may then send an update package to the master controller 50 informing the master controller 50 that the store lane 162A is empty. The master controller 50 may then send a master broadcast package toggling the AGVs 36 to the store lane 162B and the AGV 36A may then loop back around to the entrance of the store lane 162B to retrieve an empty cart 14.

Now, an exemplary decision process for an AGV 36B on the secondary loop 166 will be discussed with reference to FIGS. 13 and 14. The AGV 36B, whose route has already been selected using the route selector switch 100, has its filled cart 14 emptied at secondary process 154. The AGV 36 travels along the left edge of the magnetic tape 114 along path 232, as described above, until the AGV reads the RFID tag 234 which provides information to the PLC 78 that the AGV 36B is approaching path 220 leading to store lane 162A and path 218 leading to store lane 162B. The AGV 36B, knowing which store lane between 162A and 162B is active using the master broadcast packet from the master controller 50, uses the information provided by the RFID tag 234 to determine whether to continue along path 218 or to turn right and follow the path 220. In this example, the AGV 36B turns right to follow the path 220.

Similar to the process described above with AGV 36A, the PLC 78 of the AGV 36B, using information from the RFID tag 236, enters lane mode upon reading the RFID tag 236. The PLC 78, upon entering lane mode, utilize the pin-up logic in determining how to proceed as the pin is currently extended as detected using the pin position sensor 96.

As above, the store lane 162B is divided into individual cart receiving areas 240a-240l. Each cart receiving area 240 may include a pair of command tapes: a south command tape 242 and a north command tape 244. When the south command tape 242 is detected using the sensing head 82, the PLC 78 sets a time window in which the AGV 36B looks for a cart 14 using the obstacle sensor 110. For example, as the AGV 36B enters the cart receiving area 240j, the south command tape 242j is detected. The obstacle sensor 110 looks in zone A and the PLC 78 determines that no cart 14 is present in the cart receiving area 240i. Likewise, as the AGV 36B enters the adjacent cart receiving are 240i, the AGV 36B encounters the south command tape 242i and the PLC 78 determines no cart 14 is present in the cart receiving area 240h using the obstacle sensor 110. The AGV 36A may look for a cart in an adjacent cart receiving area 240 every time a south command tape 242 is passed.

In the illustrated example, since the cart receiving area 240*f* is occupied by a cart 14, the AGV 36B will proceed in this fashion until the south command tape 242*e* is detected. When south command tape 242*e* is detected, the PLC 78 detects the presence of the cart 14 using the obstacle sensor 110 and may slow down. The AGV 36B then looks for the north command tape 244*e* using the sensing head 82. When the north command tape 244*e* is detected, the AGV 36B stops and the PLC 78, according to the pin-up logic, causes pin actuator 92 to retract the pin, thereby unhitching to the cart 14 and leaving the cart 14 in the cart receiving area 240*e*. If the AGV 36B reaches the first cart receiving area 240*a* without retracting the pin, the AGV 36B will retract the pin when the RFID tag 245 is detected indicating the first cart receiving area 240*a* location. Similarly, if the AGV 36B detects a cart 14 in the cart receiving area 240*k* upon reading the RFID tag 236, the pin will be retracted and the cart 14 will be dropped in cart receiving area 240*l*.

Once the pin is retracted, the AGV 36B travels under the carts 14 in cart receiving areas 240*f* through 240*a*, exits the store lane 162B and reads RFID tag 246. The RFID tag 246 provides information to the PLC 78 that the AGV 36B is approaching path pairs 248 and 250. The PLC 78, knowing the selected route from the route selector switch 100, uses the information provided by the RFID tag 246 to determine whether to continue along path 248 or to turn right and follow the path 250. In this example, the AGV 36B continues along path 248 toward the store lane pair 158 until the AGV 36B reaches the RFID tag 252. The RFID tag 252 provides information to the PLC 78 that the AGV 36B is approaching path pairs 254 and 256. The PLC 78, knowing the selected route from the route selector switch 100, uses the information provided by the RFID tag 252 to determine whether to continue along path 254 or to turn right and follow the path 256. In this example, the AGV 36B turns right to follow path 256 until the AGV 36B reaches the RFID tag 257. The RFID tag 257 provides information to the PLC 78 that the AGV 36B is approaching lane paths 259 and 261. Knowing the selected route from the route selector switch 100, the PLC 78 uses information from the RFID tag 257 to determine whether to continue along path 259 or to turn right and follow path 261. In this example, the AGV 36B turns right to follow path 261 until the AGV 36B reaches the RFID tag 192. The RFID tag 192 provides information that the path 256 splits into path 194 leading to the store lane 158A and into path 196 leading to the store lane 158B. The AGV 36B, knowing which store lane between 158A and 158B is active using the master broadcast packet from the master controller 50, uses the information provided by the RFID tag 192 to determine whether to continue along path 196 or to turn right and follow the path 194. In this example, the AGV 36B follows path 196 toward store lane 158B.

The PLC 78 of the AGV 36B, using information from the RFID tag 260, enters lane mode upon reading the RFID tag 260. The PLC 78, upon entering lane mode, may now utilize the pin-down logic as the PLC 78 determines that the pin is currently retracted using the pin position sensor 96.

The store lane 158B is divided into individual cart receiving areas 262*a*-262*l*. Each cart receiving area 262 may include a pair of command tapes: a south command tape 264 and a north command tape 266. When the south command tape 264 is detected using the sensing head 82, the PLC 78 sets a time window in which the AGV 36B looks for a cart 14 using the obstacle sensor 110, as described in the pin-down process above. For example, as the AGV 36B enters the cart receiving area 262*k*, the south command tape 264*k* is detected. The obstacle sensor 110 then may look in zone A and the PLC 78 may determine that a cart 14 is present in cart receiving area 262*j*. Likewise, as the AGV 36B enters the adjacent cart receiving area 262*j*, the AGV 36B encounters the south command tape 264*j* and the PLC 78 determines that a cart is present in the cart receiving area 262*i* using the obstacle sensor 110. The AGV 36B may look for a cart 14 in an adjacent cart receiving area 262 every time a south command tape 264 is passed.

In the illustrated example, since every cart receiving area 262 is occupied by a cart 14, the AGV 36B will proceed in this fashion until the AGV reads the RFID tag 268, which indicates location at the first cart receiving area 262*a*. The AGV 36B, knowing this is the first cart receiving area 262*a* and that a cart 14 is present, may extend its pin, slow down and engage the self-aligning hitch 62. The AGV 36B may then exit the store lane 158B with the filled cart 14 in tow until it reaches RFID tag 270. The PLC 78, knowing the selected route from the route selector switch 100, uses the information provided by the RFID tag 270 to turn right and follow path 272 back toward the secondary processes 154. The AGV 36B may continue using various RFID tags and its selected route information to travel to the proper secondary process 154, where the cart 14 will be emptied.

As can be appreciated, the above described methods and systems provide for automated management of FIFO stores between manufacturing process steps. AGVs may be used to load filled carts into store lanes and to also pull filled carts, in a FIFO fashion, from the store lanes. The AGVs may be managed by a master controller which utilizes updates sent from the AGVs regarding current status of the various store lanes.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for management of first in, first out stores, the method comprising:
   producing parts at a primary process;
   processing the parts at a secondary process;
   providing a storage region including at least one store lane pair including a first store lane and a second store lane, the first store lane including a pick side, a drop side and a plurality of receiving volumes extending from the pick side to the drop side, the second store lane including a pick side, a drop side and a plurality of receiving volumes extending from the pick side to the drop side; and
   filling the receiving volumes of the first store lane with the parts in the order they are produced at the primary process in a first in, first out fashion from the pick side of the first store lane to the drop side of the first store lane using an automated guided vehicle sized and configured to pass through each of the plurality of receiving volumes, wherein after a last receiving volume nearest the drop side of the first store lane is filled, filling the receiving volumes of the second store lane using the automated guided vehicle.

2. The method of claim 1 further comprising the automated guided vehicle sending an update to a master controller that the last receiving volume nearest the drop side of the first store lane is filled.

3. The method of claim 2 further comprising the master controller signaling the automated guided vehicle to fill the second store lane upon receiving the update from the automated guided vehicle.

4. The method of claim 3 further comprising filling the receiving volumes of the second store lane with the parts in the order they are produced at the primary process in a first in, first out fashion from the pick side of the first store lane to the drop side of the second store lane using the automated guided vehicle only after receiving the signal from the master controller.

5. The method of claim 1 further comprising:
picking the parts from the receiving volumes of the first store lane in a first in, first out fashion from the pick side of the first store lane to the drop side of the first store lane using a different automated guided vehicle; and
transporting the parts picked from the first store lane to the secondary process using the different automated guided vehicle.

6. The method of claim 5, wherein after a part is picked from the last receiving volume nearest the drop side of the first store lane, picking the parts from the receiving volumes of the second store lane using the different automated guided vehicle.

7. The method of claim 6 further comprising the different automated guided vehicle sending an update to a master controller that the part is picked from the last receiving volume nearest the drop side of the first store lane.

8. The method of claim 7 further comprising the master controller signaling the different automated guided vehicle to fill the second store lane upon receiving the update from the different automated guided vehicle.

9. The method of claim 1 further comprising filling carts transported by the automated guided vehicle with the parts produced at the primary process, the carts with the parts filling the receiving volumes of the first store lane, the carts sized and configured to allow the automated guided vehicle to pass through the receiving volumes occupied by the carts.

10. A system for transporting parts from a primary process to a secondary process in a first in, first out fashion, the system comprising:

a plurality of automated guided vehicles including at least a first automated guided vehicle in a primary loop associated with the primary process and a second automated vehicle in a secondary loop associated with the secondary process;
a first store lane having a first pick end, a first drop end and a plurality of first receiving volumes from the first pick end to the first store end, the first automated guided vehicle used to fill the first store lane with the parts from the first pick end to the first drop end and the second automated guided vehicle used to remove the parts from the first store lane from the first pick end to the first drop end;
a second store lane having a second pick end, a second drop end and a plurality of second receiving volumes from the second pick end to the second store end, the first automated guided vehicle used to fill the second store lane with the parts from the second pick end to the second drop end and the second automated guided vehicle used to remove the parts from the second store lane from the second pick end to the second drop end; and
a master controller including logic that toggles the first automated guided vehicle from the first store lane to the second store lane based on an update received from the first automated guided vehicle indicating that a last first receiving volume of the first store lane nearest the first drop side is filled.

11. The system of claim 10 further comprising a route system that is used to guide the plurality of automated guided vehicles in their respective primary loop and secondary loop.

12. The system of claim 11, wherein the route system comprises a path indicator that the automated guided vehicles follow and location indicators that provide location information to the automated guided vehicles.

13. The system of claim 12, wherein the path indicator comprises magnetic tape and the location indicators comprise RFID tags.

14. The system of claim 10 further comprising a plurality of carts configured to be transported by the plurality of automated guided vehicles, the carts configured to hold at least one of the parts.

15. The system of claim 10, wherein the first automated guided vehicle includes a controller that generates the update and a transponder that provides the update to the master controller.

16. The system of claim 10, wherein the master controller includes logic that toggles the second automated guided vehicle from the first store lane to the second store lane based on an update received from the second automated guided vehicle indicating that parts from the last first receiving volume of the first store lane nearest the first drop side is picked.

* * * * *